(12) United States Patent
Mashiko

(10) Patent No.: US 6,681,750 B2
(45) Date of Patent: Jan. 27, 2004

(54) BLOW-BY GAS VENTILATION SYSTEM FOR ENGINE

(75) Inventor: Tetsuya Mashiko, Shizuoka (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 70 days.

(21) Appl. No.: 09/990,174

(22) Filed: Nov. 20, 2001

(65) Prior Publication Data

US 2002/0088444 A1 Jul. 11, 2002

(30) Foreign Application Priority Data

Nov. 20, 2000 (JP) .................................... 2000-353626

(51) Int. Cl.⁷ .............................................. F01M 13/00
(52) U.S. Cl. ...................................................... 123/572
(58) Field of Search ................................ 123/572, 573, 123/574

(56) References Cited

U.S. PATENT DOCUMENTS

| | | | |
|---|---|---|---|
| 5,005,553 A | * | 4/1991 | Washizu et al. ............. 123/572 |
| 5,329,913 A | * | 7/1994 | Suzuki et al. ................ 123/573 |
| 5,514,015 A | | 5/1996 | Okazawa et al. |
| 5,794,602 A | | 8/1998 | Kimura |
| 5,951,344 A | * | 9/1999 | Tsunoda et al. ............. 123/572 |
| 6,044,828 A | | 4/2000 | Matsushita |
| 6,082,343 A | | 7/2000 | Oishi et al. |
| 6,152,119 A | | 11/2000 | Hoshiba et al. |
| 6,190,221 B1 | | 2/2001 | Nanami |
| 6,227,184 B1 | | 5/2001 | Katayama et al. |
| 6,408,835 B1 | * | 6/2002 | Katayama et al. .......... 123/572 |

OTHER PUBLICATIONS

Co–pending patent application: Ser. No. 09/960573, filed Sep. 20, 2001, entitled Ventilation System for Watercraft Engine, in the name of Hitoshi Muramatsu, et al., and assigned to Sanshin Kogyo Kabushiki Kaisha.

* cited by examiner

Primary Examiner—Marguerite McMahon
(74) Attorney, Agent, or Firm—Knobbe, Martens & Olson & Bear, LLP

(57) ABSTRACT

A blow-by gas ventilation system particularly suited for use with a small watercraft includes a oil separation chamber preferably disposed within a plenum chamber defined by an air intake box. An inlet tube permits blow-by gases to move from the crankcase chamber of the engine to the oil separation chamber. An outlet allows blow-by gases to move from the oil separation chamber to the plenum chamber. Desirably, an outlet tube connects the outlet to an opening in an intake port of the induction system to discharge blow-by gases into the intake port. The oil separation chamber may be defined by a cover member, along with a portion of the interior surface of the air intake box.

20 Claims, 4 Drawing Sheets

BLOW-BY GAS VENTILATION SYSTEM FOR ENGINE

RELATED CASES

This application is based on and claims priority to Japanese Patent Application No. 2000-353626, filed Nov. 20, 2000, the entire contents of which are hereby expressly incorporated by reference.

BACKGROUND OF THE INVENTION

1. Field of the Invention

The present invention relates to a blow-by gas ventilation system for an engine. More specifically, the present invention relates to a blow-by gas ventilation system particularly adapted for use in a small watercraft.

2. Description of the Related Art

In most four-cycle engines, including those utilized in personal watercraft, a portion of the fuel/air charge delivered to the combustion chamber passes beyond the piston ring(s) and into the crankcase chamber, before being combusted, due to the extreme pressures generated in the combustion chamber. These fuel/air gases, or "blow-by" gases, are generally reintroduced into the induction system of the engine, through a ventilation system, to be combusted along with a fresh fuel/air charge. The blow-by gases tend to collect oil mist generated by the movement of engine components within the crankcase, such as the crankshaft and connecting rods.

It is generally desirable to separate the oil mist component of the blow-by gases from the fuel/air component so as to avoid undesired combustion of lubrication oil. An oil separation system is typically employed to separate these components and route the majority of the oil portion back to the lubrication system and route the fuel/air portion into the induction system. However, in the context of a personal watercraft, it is often not practicable to provide a separate system within the limited space of the hull to perform this function, without detriment to the size and/or layout of other engine components.

Further, when an oil separation system is employed in an engine arrangement, the blow-by gases are typically introduced freely into a plenum chamber of the engine. With such an arrangement, any oil mist that was not successfully separated from the blow-by gases may come into contact with the air filter element within the plenum chamber. Over time, the oil mist may clog the air filter element and have a negative effect on performance due to reduced airflow through the air filter element.

SUMMARY OF THE INVENTION

Accordingly, one aspect of the present invention is a blow-by gas ventilation system that separates an oil mist component of the blow-by gas from a fuel/air component and efficiently utilizes the available space within an engine compartment of a personal watercraft. Another aspect of the present invention provides a blow-by gas ventilation system that inhibits contact of oil mist remaining in the blow-by gas introduced into the plenum chamber of an engine from contacting the air filter element.

An aspect of the present invention is a watercraft including a hull defining an engine compartment. An internal combustion engine is disposed within the engine compartment. A propulsion device is driven by the engine of the watercraft. The engine includes an engine body defining a crankcase and at least one combustion chamber. A lubrication system supplies lubricant to at least the crankcase of the engine. An induction system is configured to guide air along an induction airflow path to the combustion chamber for combustion therein. The induction system includes a plenum chamber. A blow-by gas ventilation system allows blow-by gasses to move along a ventilation flow path from the crankcase to the plenum chamber. The blow-by gas ventilation system includes an oil separation chamber positioned within the plenum chamber. The ventilation flow path passes through the oil separation chamber.

Another aspect of the present invention is a watercraft having a hull defining an engine compartment. An internal combustion engine is disposed within the engine compartment and a propulsion device is driven by the engine. The engine includes an engine body defining a crankcase and at least one combustion chamber therein. A lubrication system supplies lubricant to at least the crankcase of the engine. An induction system is configured to guide air along an induction airflow path to the combustion chamber for combustion therein. The induction system includes a plenum chamber and a throttle body, which defines an intake port. A fuel delivery system delivers fuel to the combustion chamber and includes a fuel injector communicating with the intake port. A blow-by gas ventilation system for allowing blow-by gasses to move along a ventilation flow path from the crankcase to the plenum chamber. The blow-by gas ventilation system includes an oil separation chamber positioned within the plenum chamber. The ventilation flow path passes through the oil separation chamber.

A further aspect of the present invention involves a watercraft including a hull defining an engine compartment. An internal combustion engine is disposed within the engine compartment and a propulsion device is driven by the engine. The engine includes an engine body defining a crankcase and at least one combustion chamber therein. A lubrication system supplies lubricant to at least the crankcase of the engine. An induction system is configured to guide air along an induction airflow path to the combustion chamber for combustion therein. The induction system includes at least one throttle body and an inlet duct connected to the at least one throttle body. The throttle body and inlet duct at least partially defines an intake passage. A blow-by gas ventilation system includes an inlet communicating with the crankcase, an outlet communicating with the intake passage and a ventilation passage connecting the inlet and the outlet.

An additional aspect of the present invention involves a watercraft including a hull defining an engine compartment. An internal combustion engine is disposed within the engine compartment and a propulsion device is driven by the engine. The engine includes an engine body defining a crankcase and at least one combustion chamber therein. A lubrication system supplies lubricant to at least the crankcase of the engine. An induction system is configured to guide air along an induction airflow path to the combustion chamber for combustion therein. The induction system includes a plenum chamber. A blow-by gas ventilation system allows blow-by gasses to move along a ventilation flow path from the crankcase to the plenum chamber. Means are provided for separating lubricating oil from the blow-by gas and the means is positioned within the plenum chamber.

Another aspect of the present invention is a watercraft having a hull defining an engine compartment. An internal combustion engine is disposed in the engine compartment and a propulsion device is driven by the engine. The engine includes an engine body defining a crankcase and at least one combustion chamber therein. A lubrication system supplies lubricant to at least the crankcase of the engine. An induction system is configured to guide air along an induction airflow path to the combustion chamber for combustion therein. The induction system includes a plenum chamber, an air filter element and at least one throttle body. The air filter element is positioned upstream from the at least one throttle body. A blow-by gas ventilation system allows blow-by gasses to move along a ventilation flow path from the crankcase to the plenum chamber. The blow-by gas ventilation system includes an oil separation chamber. The air filter element, the at least one throttle body and the oil separation chamber are disposed within the plenum chamber and the at least one throttle body is positioned between the air filter element and the oil separation chamber.

Further aspects, features and advantages of this invention will become apparent from the detailed description of the preferred embodiment which follows.

BRIEF DESCRIPTION OF THE DRAWINGS

These and other features, aspects and advantages of the present invention will now be described with reference to the drawings of a preferred embodiment which is intended to illustrate and not to limit the invention. The drawings comprise 4 figures.

DETAILED DESCRIPTION OF THE PREFERRED EMBODIMENT

Figure 1:
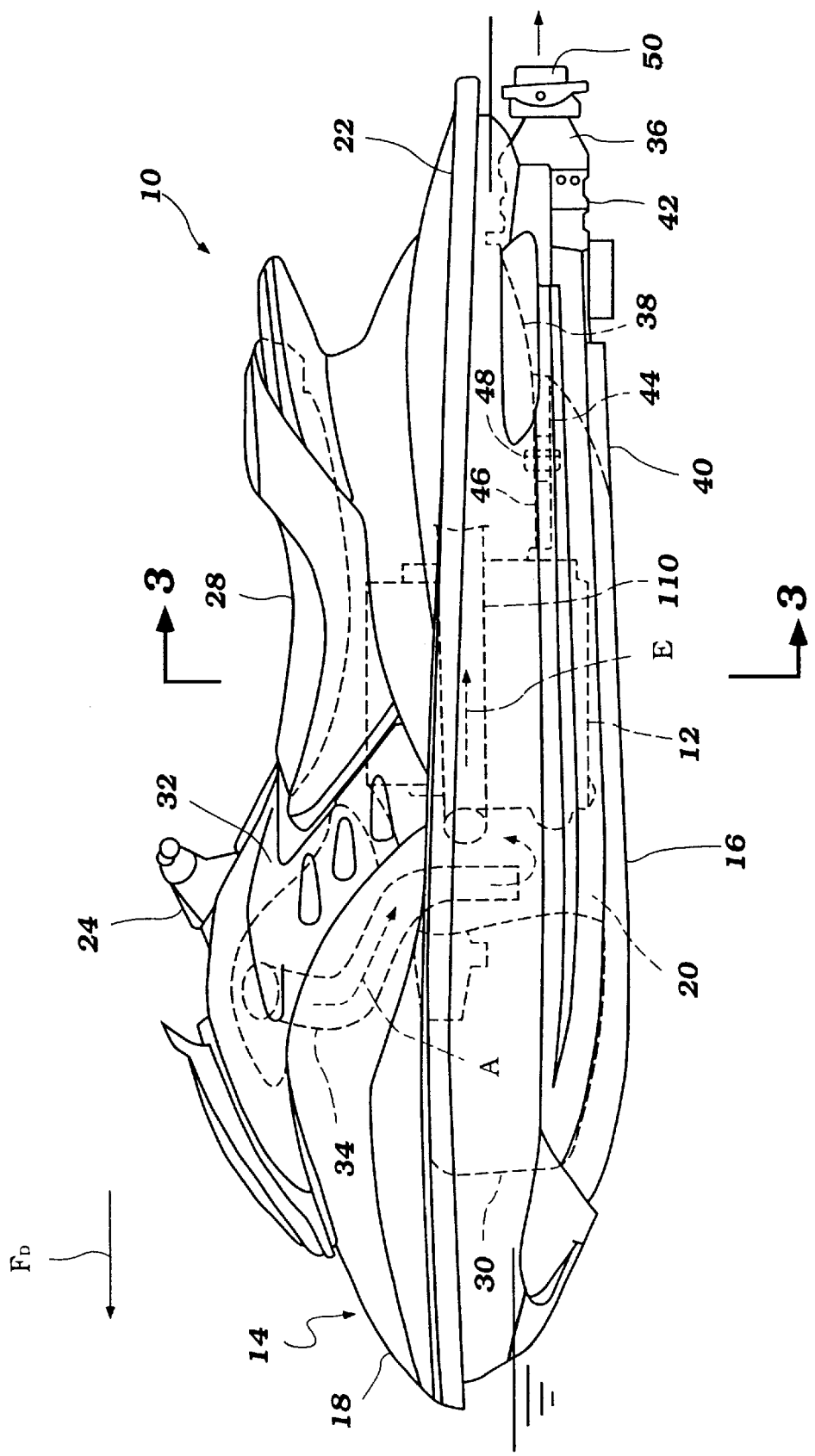
FIG. 1 is a side elevational view of a personal watercraft of the type powered by an engine configured in accordance with a preferred embodiment of the present invention. Several of the internal components of the watercraft (e.g., the engine) are illustrated in phantom.

With reference to FIG. 1, a watercraft 10 employs an internal combustion engine 12 configured in accordance with a preferred embodiment of the present invention. The described engine configuration has particular utility with personal watercraft, and thus, is described in the context of personal watercraft. The engine configuration, however, can be applied to other types of water vehicles as well, such as, for example, small jet boats, all-terrain vehicles, and snowmobiles.

Figure 3:
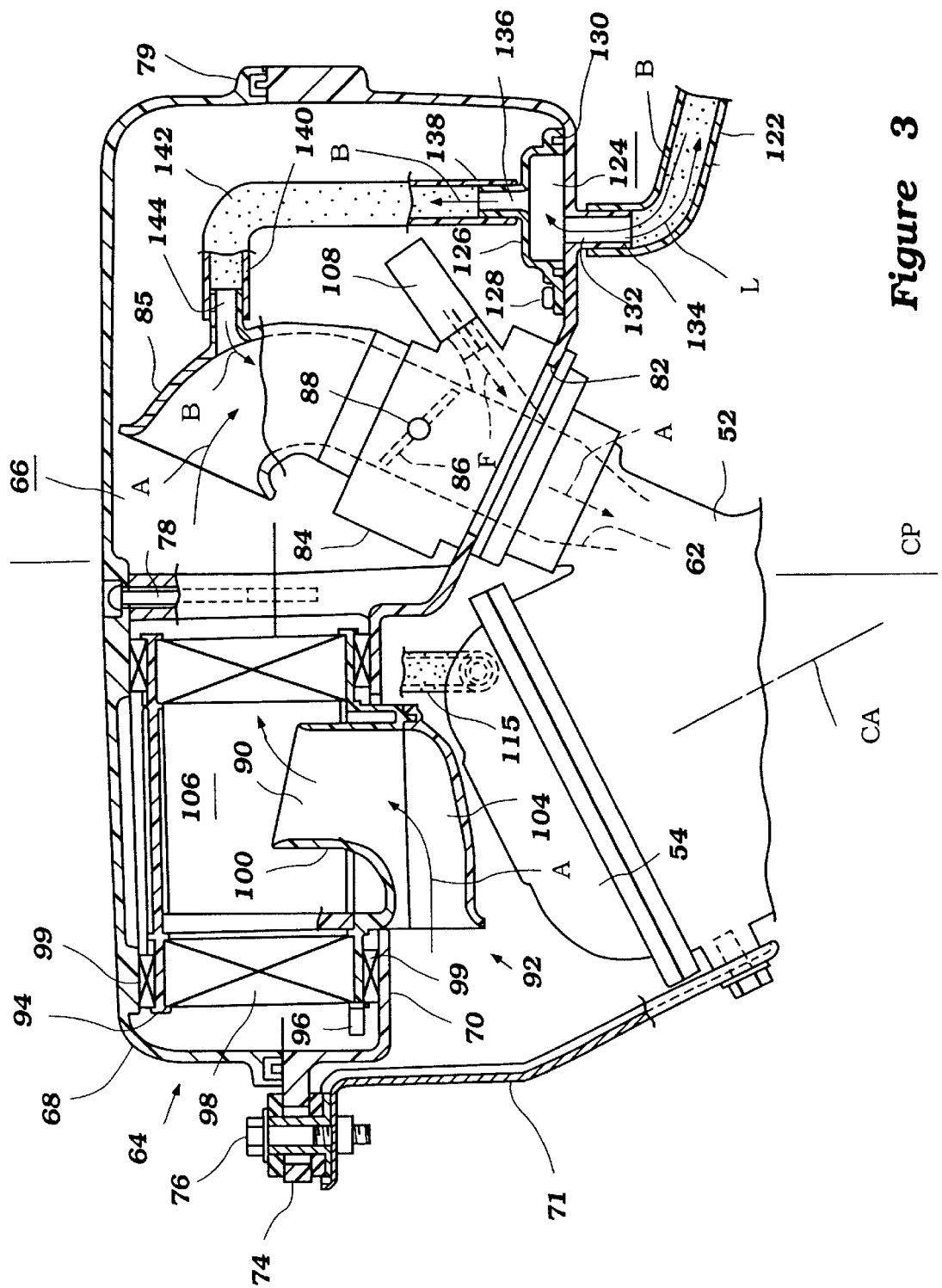
FIG. 3 is an enlarged cross-section of the induction system of taken along the section line 3—3 of FIG. 1.

The personal watercraft 10 includes a hull 14 formed with a lower hull section 16 and an upper hull section or deck 18. Both the hull sections 16, 18 are made of, for example, a molded fiberglass reinforced resin or a sheet molding compound. The lower hull section 16 and the upper hull section 18 are coupled together to define an internal cavity 20 (FIG. 3). A bond flange 22 defines an intersection of both the hull sections 16, 18.

A control mast 24 extends upwardly to support a handle bar 26. The handle bar 26 is provided primarily for controlling the directions in which the water jet propels the watercraft 10. Grips are formed at both ends of the bar 26 so that the rider can hold them for that purpose. The handle bar 26 also desirably carries other control units such as, for example, a throttle lever 58 that is used for control of running conditions of the engine 12.

A seat 28 extends rearward from the control mast 24 along a center plane CP (FIG. 3) of the watercraft 10 and generally defines a rider's area. The seat 28 has a saddle shape and hence a rider can sit on the seat 28 in a straddle-type fashion. Foot areas (not shown) are defined on both sides of the seat 28 on a top surface of the upper hull section 18. A cushion supported by the upper hull section 18, at least in principal part, forms the seat 28. The seat 28 is preferably detachably attached to the upper hull section 18. An access opening (not shown) may be defined under the seat 28 through which the rider can access the internal cavity 20. That is, the seat 28 usually closes the access opening.

A fuel tank 30 is disposed in the cavity 20 under a bow portion 32 of the upper hull section 18. The fuel tank 30 is coupled with a fuel inlet port positioned at a top surface of the upper hull section 18 through a duct. A closure cap (not shown) desirably closes the fuel inlet port. An opening disposed under a hatch cover 48 is available for accessing the fuel tank 30.

The engine 12 is disposed in an engine compartment defined in the cavity 20. The engine compartment preferably is located under the seat 28, but other locations are also possible (e.g., beneath the control mast or in the bow). The rider thus can access the engine 12 in the illustrated embodiment through the access opening by detaching the seat 28.

A pair of air ducts or ventilation ducts 34 (one shown) are provided on both sides of the bow portion 32 so that the ambient air can enter the internal cavity 20 therethrough. Except for the air ducts 34, the engine compartment is substantially sealed so as to protect the engine 12 and other components from water.

A jet pump unit 36 propels the watercraft 10. The jet pump unit 36 is disposed in a tunnel 38 formed on the underside of the lower hull section 16 which is isolated from the engine compartment by a bulkhead. The tunnel 38 has a downward facing inlet port 40 opening toward the body of water. A jet pump housing 42 is disposed within a portion of the tunnel 38 and communicates with the inlet port 40. An impeller is supported within the housing 42.

An impeller shaft 44 extends forwardly from the impeller and is coupled with a crankshaft 46 of the engine 12 by a coupling member 48. The crankshaft 46 of the engine 12 thus drives the impeller shaft 44. The rear end of the housing 42 defines a discharge nozzle and a steering nozzle 50 is affixed to the discharge nozzle for pivotal movement about a steering axis extending generally vertically. The steering nozzle 50 is connected to the handle bar 26 by a cable so that the rider can pivot the nozzle 50.

As the engine 12 drives the impeller shaft 44 and hence rotates the impeller, water is drawn from the surrounding body of water through the inlet port 40. The pressure generated in the housing 42 by the impeller produces a jet of water that is discharged through the steering nozzle 50. This water jet propels the watercraft 10 in a forward direction, as illustrated by the arrow $F_D$. The rider can move the steering nozzle 50 with the handle bar 26 when he or she desires to turn the watercraft 10 in either direction. In addition, a suitable reverse thrust assembly may be provided if desired to permit reverse propulsion of the watercraft 10.

Figure 2:
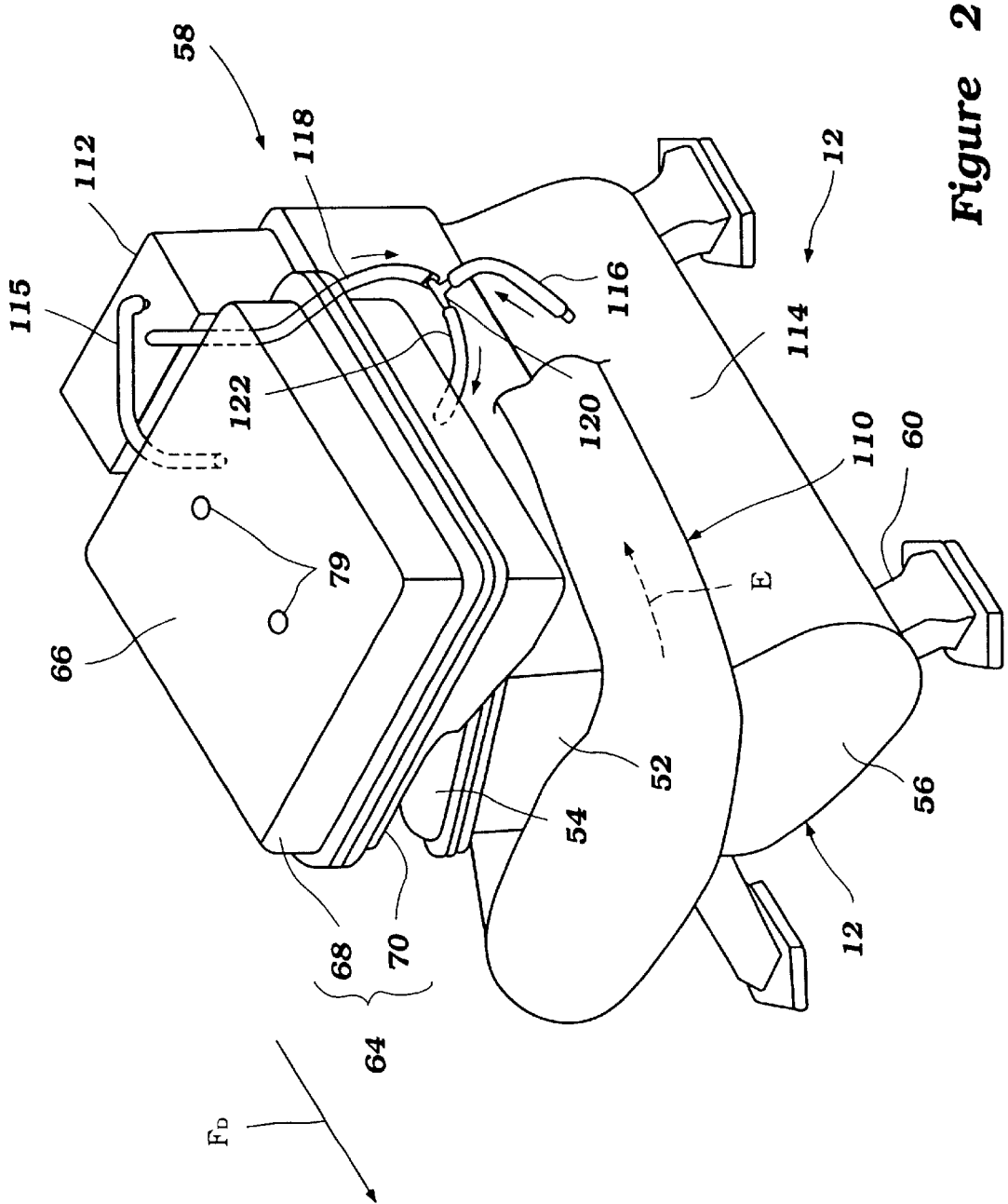
FIG. 2 is a perspective view of the engine and an induction system arrangement of FIG. 1.

The illustrated engine 12 operates on a four-stroke cycle combustion principle. With reference to FIGS. 2 and 3, the engine 12 includes a cylinder block 52. The cylinder block 52 defines four cylinder bores (not shown) spaced from each other from fore to aft along the center plane CP. The engine 12 is, thus, an L4 (in-line four cylinder) type. The illustrated engine, however, merely exemplifies one type of engine on which various aspects and features of the present invention can be used. Engines having other number of cylinders, having other cylinder arrangements, other cylinder orientations (e.g., upright cylinder banks, V-type, and W-type) and operating on other combustion principles (e.g., crankcase compression two-stroke, diesel, and rotary) are all practicable.

Each cylinder bore has a center axis CA that is slanted or inclined at an angle from the center plane CP so that the engine 12 height can be decreased. All the center axes CA in the illustrated embodiment are inclined at the same angle. Pistons (not shown) reciprocate within the cylinder bores. A cylinder head member 54 is affixed to the upper end of the cylinder block 52 to close respective upper ends of the cylinder bores. The cylinder head member 54, together with the cylinder bores and the pistons, defines a set of combustion chambers.

A crankcase member 56 is affixed to the lower end of the cylinder block 52 to close the respective lower ends of the cylinder bores and to define a crankcase chamber. As is known, the crankshaft 46 is rotatably connected to the pistons through connecting rods 104 and is journaled for rotation relative to the crankcase member 56. That is, the connecting rods 104 are rotatably coupled with the pistons and with the crankshaft 46.

The cylinder block 52, the cylinder head member 54 and the crankcase member 56 together define an engine body 58. The engine body 58 preferably is made of an aluminum based alloy. In the illustrated embodiment, the engine body 58 is oriented in the engine compartment so as to position the crankshaft 46 generally parallel to the central plane CP and to extend generally in the longitudinal direction. Other orientations of the engine body, of course, are also possible (e.g., with a transverse or vertical oriented crankshaft).

Engine mounts 60 extend from both sides of the engine body 58. The engine mounts 60 preferably include resilient portions made of, for example, a rubber material. The engine 12 preferably is mounted on the lower hull section 16, specifically, a hull liner, by the engine mounts 60 so that vibration of the engine 12 is inhibited from directly conducting to the lower hull section 16.

The engine 12 preferably includes an air induction system to introduce air to the combustion chambers. In the illustrated embodiment, the air induction system includes four air intake ports 62 (one shown) defined in the cylinder head member 54. As illustrated in FIG. 3, one intake port 62 preferably communicates with each of the combustion chambers. As is known in four-cycle practice, intake valves (not shown) preferably are provided to selectively connect and disconnect the intake ports 62 with the combustion chambers. That is, the intake valves selectively open and close the intake ports 62.

The air induction system also includes an air intake box 64 or a "plenum chamber" for smoothing intake air and acting as an intake silencer. The intake box 64 in the illustrated embodiment is generally configured as a rectangular and defines a plenum chamber 66. Other shapes of the intake box of course are possible, but it is desired to make the plenum chamber as large as possible within the space provided in the engine compartment. The rectangular shape of at least a principal portion of the illustrated intake box 64 advantageously conforms to the space between the upper surface of the engine 12 and the interior surface of the upper portion of the hull 18.

With reference to FIGS. 2 and 3, the intake box 64 comprises an upper chamber member 68 and a lower chamber member 70. The upper and lower chamber members 68, 70 preferably are made of plastic or synthetic resin, although they can be made of metal or other material. While the illustrated embodiment involves the intake box 64 being formed by upper and lower chamber members, the chamber member can be formed by a different number of members and/or can have a different assembly orientation (e.g., side-by-side).

The lower chamber member 70 preferably is coupled with the engine body 58. In the illustrated embodiment, several stays 72 extend upwardly from the engine body 58 and a flange portion 74 of the lower chamber member 70 extends generally horizontally. Several fastening members, for example, bolts 76, rigidly affix the flange portion 74 to respective top surfaces of the stays 72. The upper chamber member 68 has a flange portion 78 that abuts on the flange portion 74 of the lower member 70. Desirably, a plurality of fasteners 79 couple the upper and lower chamber members 68, 70. Although the illustrated fasteners 79 are threaded fasteners (FIG. 3), such as machine screws, any variety of a suitable coupling or fastening members may be provided to couple the upper chamber member 68 with the lower chamber member 70.

Figure 4:
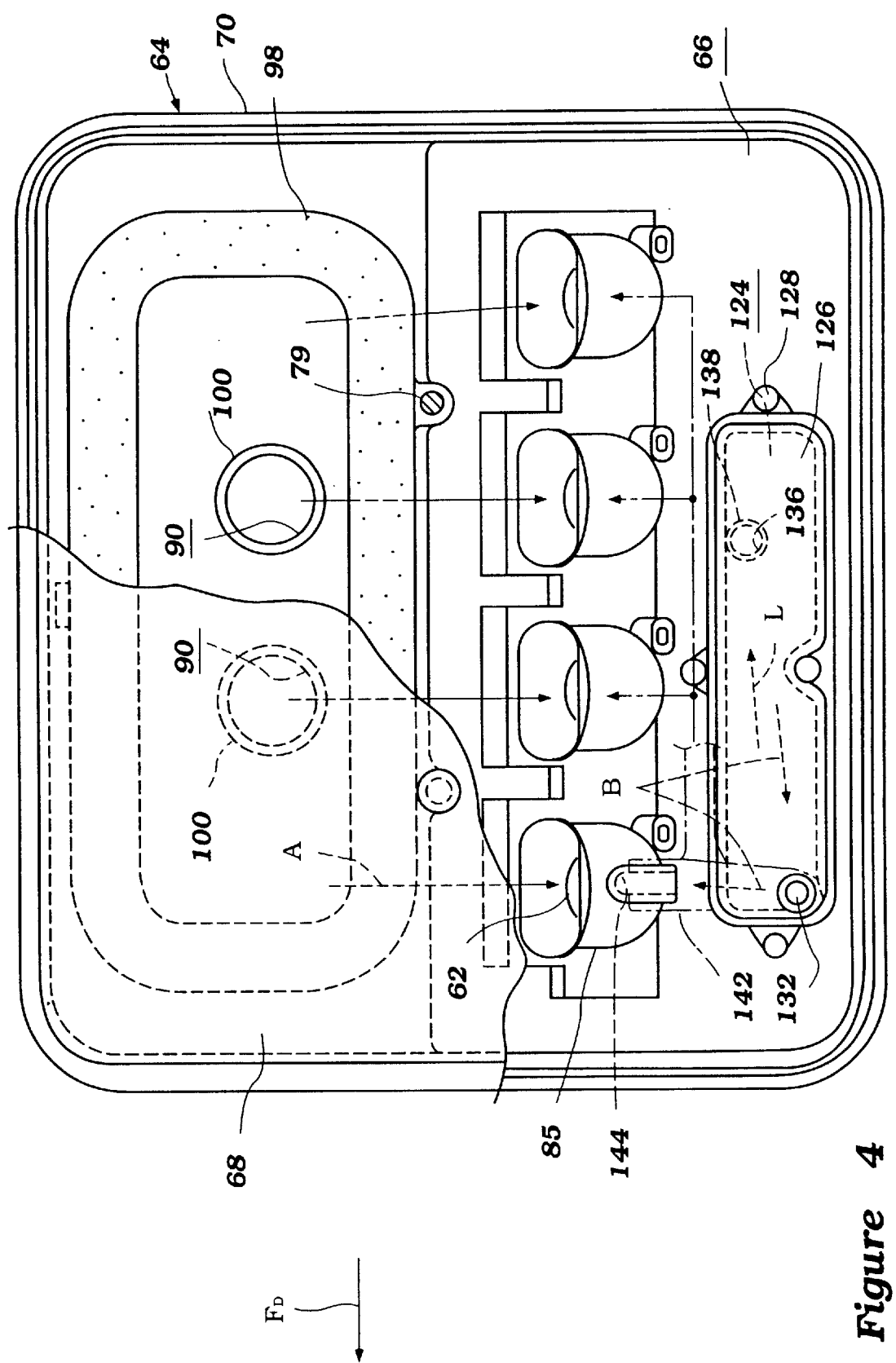
FIG. 4 is a top plan view of the induction system of FIG. 2 with a portion cutaway.

With reference to FIGS. 3 and 4, the lower chamber member 70 defines an inlet opening 80 and four outlet apertures 82 (one shown). Four throttle bodies 84 extend through the apertures 82 and preferably are fixed to the lower chamber member 70. Respective bottom ends of the throttle bodies 84 are coupled with the associated intake ports 62. Preferably, as illustrated in FIG. 3, the position at which the apertures 82 are sealed to the throttle bodies 84 are spaced from the outlet of bottom ends of the throttle bodies 84. Thus, the lower member 70 is spaced from the engine 12, thereby attenuating transfer of heat from the engine body 58 into intake box 64.

With reference to FIG. 3, the throttle bodies 84 slant toward the port side opposite the center axis CA of the engine body 58. Respective top ends of the throttle bodies 84 open upwardly within the plenum chamber 66. Desirably, an inlet duct 85 is connected to the top end of each of the throttle bodies 84 and define a portion of each of the intake ports 62. The inlet ducts 85 assist in guiding a flow of air into the throttle bodies 84. Air in the plenum chamber 66 thus is drawn to the combustion chambers through the inlet ducts 85, throttle bodies 84 and the intake ports 62 when negative pressure is generated in the combustion chambers. The negative pressure is generated when the pistons move toward a bottom dead center position from a top dead center position with respect to the cylinder bores (i.e., during the intake stroke).

Each throttle body 84 includes a throttle valve 86. A throttle valve shaft 88 journaled for pivotal movement, links all of the throttle valves 86 in the illustrated arrangement. Pivotal movement of the throttle valve shaft 88 is controlled by a throttle lever on the handle bar 26 through a control cable that is connected to the throttle valve shaft 88. The control cable can extend into the intake box 64 through a suitable through-hole defined preferably at a side surface of the lower chamber member 70. The rider thus can control an opening amount of the throttle valves 86 by operating the throttle lever so as to obtain various running conditions of the engine 12 that the rider desires, as is conventional in the art.

With reference to FIG. 4, air is introduced into the plenum chamber 66 through a pair of air inlet ports 90. Desirably, a filter assembly 92 surrounds the inlet ports 90. The filter assembly 92 preferably comprises an upper plate 94, a lower plate 96 and a filter element 98 interposed between the upper and lower plates 94, 96. Desirably, a pair of seal members 99 are interposed between the upper and lower plates 94, 96 and the upper and lower chamber members 68, 70, respectively. The lower plate 96 includes two ducts 100 that extend inwardly toward the plenum chamber 66. The ducts 100 form the inlet ports 90. The ducts 100 are positioned generally above the cylinder head member 54. Desirably, the upper ends of the ducts 100 slant to face the throttle bodies 84. In the illustrated embodiment, the upper or inlet ends of the ducts 100 define a low point proximate to the outlet apertures 82 and a high point distal from the apertures 82. This is advantageous because a smooth flow of air may move from the inlet ducts 100 to the intake ports 62. The upper ends of the ducts 100 can slant away from the throttle bodies 84 in some arrangements.

In the illustrated embodiment, a guide member 102 is affixed to the lower plate 96 immediately below the ducts 100. The guide member may be secured to the lower plate 96 by any suitable fastening means. The guide member 102 defines a pair of recesses 104 that are associated with the respective ducts 100. The recesses 104 open toward the starboard side. The air in the cavity 20 of the engine compartment thus is drawn into the plenum chamber 66 along the recesses 104 of the guide member 102 and then through the ducts 100.

The filter assembly 92, including the lower plate 96, is configured generally rectangular in shape in a plan view. The filter element 98 extends along a periphery of the rectangular shape so as to have a certain thickness from a peripheral edge. The ducts 100 open to a hollow 106 defined by the filter element 98. The air in this hollow 106 thus cannot reach the throttle bodies 84 unless passing through the filter element 98. Foreign substances in the air are removed by the filter element 98 accordingly. Preferably, the filter element 98 is air permeable and water impermeable.

The engine 12 also includes a fuel supply system, which includes the fuel tank 30 and fuel injectors 108 associated with each of the throttle bodies 84. A fuel rail (not shown) extends generally horizontally in the longitudinal direction and supplies fuel from the fuel tank 30 to each of the fuel injectors 108 in the illustrated arrangement. Because the throttle bodies 84 are disposed within the plenum chamber 66, the fuel injectors 108 are also desirably positioned within the plenum chamber 66. As a result, the throttle bodies 84 are substantially insulated from contact with water. In addition, air flow within the plenum chamber tends to cool the components of the fuel injectors 108. However, other types of fuel injectors can be used, which are not mounted in the intake box 66, such as, for example, but without limitation, direct fuel injectors and induction passage fuel injectors connected to the scavenge passages of two-cycle engines. Electrical cables for the fuel injectors 108 desirably enter the intake box 64 through a through-hole provided for the control cable of the throttle shaft 88, as described above. Each fuel injector 108 has an injection nozzle directed toward the intake port 62 associated with each fuel injector 108.

The fuel supply system also desirably includes a low-pressure fuel pump, a vapor separator, a high-pressure fuel pump and a pressure regulator, in addition to the fuel tank 30, the fuel injectors 108 and the fuel rail. Fuel supplied from the fuel tank 30 is pressurized by the low pressure fuel pump and is delivered to the vapor separator in which the fuel is separated from fuel vapors. One or more high-pressure fuel pumps draw the fuel from the vapor separator and pressurize the fuel before it is delivered to the fuel rail. The pressure regulator controls the pressure of the supplied fuel, i.e., limits the fuel pressure to a preset pressure level. The fuel rail can be configured to support the fuel injectors 108 as well as deliver the fuel to the respective fuel injectors 108. The fuel injectors 108 spray the fuel into the intake ports 62 at an injection timing and duration under control of an ECU (Electronic Control Unit). The ECU can control the injection timing and duration according to any known control strategy which preferably refers to a signal from at least one engine sensor, such as, for example, but without limitation, the throttle valve position sensor.

The sprayed fuel is delivered to the combustion chambers with the air when the intake ports 62 are opened to the combustion chambers by the intake valves. The air and the fuel are mixed together to form air/fuel charges which are then combusted in the combustion chambers.

The engine 12 further includes a firing or ignition system in which four spark plugs are affixed to the cylinder head member 54 so that electrodes, which are defined at one ends of the plugs, are exposed to the respective combustion chambers. Plug caps are detachably coupled with the other ends of the spark plugs and have electrical connection with the plugs. Electric power is supplied to the plugs through power cables and the plug caps. The spark plugs are fired at an ignition timing under control of the ECU. The air/fuel charge is combusted during every combustion stroke, as is known in the art.

With reference to FIGS. 1 and 2, the engine 12 further includes an exhaust system to discharge burnt charges, i.e., exhaust gases, from the combustion chambers. The exhaust system desirably includes four exhaust ports defined in the cylinder head member 54 that are in communication with the associated combustion chambers. Exhaust valves are provided to selectively connect and disconnect the exhaust ports with the combustion chambers. That is, the exhaust valves selectively open and close the exhaust ports. An exhaust pipe assembly 110 defines an exhaust passage to move exhaust gases E to a suitable exhaust discharge, as known in the art.

The engine 12 desirably includes a cooling system configured to circulate coolant into thermal communication with at least one component within the watercraft 10. Preferably, the cooling system is an open type cooling system, circulating water from the body of water in which the watercraft 10 is operating, into thermal communication with heat generating components within the watercraft 10. However, other types of cooling systems can be used, such as, for example, but without limitation, closed-type liquid cooling systems using lubricated coolants and air-cooling types.

Ambient air enters the internal cavity 20 defined in the hull 14 through the air ducts 34. The air is then introduced into the plenum chamber 66 defined by the intake box 64 through the air inlet ports 90 and drawn into the throttle bodies 84. The air filter element 98, which preferably comprises a water-repellent element and an oil resistant element, filters the air. The majority of the air in the plenum chamber 66 is supplied to the combustion chambers 98. The throttle valves 86 in the throttle bodies 84 regulate an amount of the air permitted to pass to the combustion chambers 98. The opening angles of the throttle valves 86 are controlled by the rider with the throttle lever 58 and thus controls the airflow across the valves. The air hence flows into the combustion chambers 98 when the intake valves open. At the same time, the fuel injectors 108 spray fuel F into the intake ports 62 under the control of ECU. Air/fuel charges are thus formed and delivered to the combustion chambers 98.

The air/fuel charges are fired by the spark plugs under the control of the ECU. The burnt charges, i.e., exhaust gases, are discharged to the body of water surrounding the watercraft 10 through the exhaust system.

The combustion of the air/fuel charges causes the pistons reciprocate and thus causes the crankshaft 46 to rotate. The crankshaft 46 drives the impeller shaft 44 and the impeller rotates in the hull tunnel 38. Water is thus drawn into the tunnel 38 through the inlet port 40 and then is discharged rearward through the steering nozzle 50. The rider steers the nozzle 50 by the steering handle bar 26. The watercraft 10 thus moves as the rider desires.

The engine 12 preferably includes a lubrication system that delivers lubricant oil to engine portions for inhibiting frictional wear of such portions. This system is desirably a closed-loop type and includes an oil reservoir 112 as illustrated in FIG. 2. An oil delivery pump is provided within a circulation loop to deliver the oil in the reservoir 112 to the engine portions that are to be lubricated, for example, but without limitation, the pistons and crankshaft bearings. The delivery pump preferably is driven by the crankshaft or one of the camshafts (not shown).

The engine 12 also includes a blow-by gas and oil mist collection system. Although several piston rings are disposed around the respective pistons and substantially prevent the air/fuel charges from leaking to a crankcase chamber 114, defined within the crankcase member 56, from the combustion chambers, part of the charges nevertheless pass through the seal due to the tremendous pressure in the combustion chambers. The air/fuel charges that have leaked form the combustion chambers form blow-by gases and drift into the crankcase chamber 114. In addition, the lubricant oil in the crankcase chamber 114 can form oil mist due to rapid rotation of the crankshaft and the oil mist also drifts within the crankcase chamber 114.

Additionally, blow-by gases and oil mist may move throughout the lubrication system and collect in various portions of the engine 12, including within the cylinder head member 54, for example. With reference to FIG. 2, an oil overflow tube 115 connects the cylinder head member 54 (connection shown in FIG. 3) and the reservoir 112 to allow excess lubrication oil within the reservoir to be displaced to the cylinder head member 54, where it is reintroduced into the lubrication system. Blow-by gases and oil mist may move through the oil overflow tube 115 from the cylinder head member 54 and collect in the oil reservoir 112.

The blow-by gas and oil mist collection system thus collects such gases and mist, separates liquid components from gaseous components and then guides the separated liquid components to the lubrication system and the gaseous components to the air induction system, as will be described in detail. The blow-by gases and oil mist together are referred to as "blow-by gases" or "blow-by gas" herein unless otherwise described.

A series of conduits are provided to allow blow-by gases to move from both the crankcase chamber 114 and the oil reservoir 112 to the plenum chamber 64. Specifically, a first breather tube 116 defines a passage that communicates with the crankcase chamber 114 and a second breather tube 118 defines a passage that communicates with the interior chamber of the oil reservoir 112. A connector 120 connects the first and second breather tubes 116, 118 with a third breather tube 122. The third breather tube 122 defines a passage that communicates with the plenum chamber 64. Thus, blow-by gases from the crankcase chamber 114 and reservoir 112 are evacuated to the plenum chamber 64. The breather tubes 116, 118, 122 may comprise any type of suitable material, including flexible rubber hose or shaped metal conduits.

With reference to FIGS. 3 and 4, the blow-by gas and oil mist collection system is shown in greater detail. An oil separation chamber 124 preferably is defined by a cover member 126, along with an interior surface of the lower chamber member 70 of the intake box 64. Alternatively, the oil separation chamber 124 may be defined by a separate member positioned within the plenum chamber 66, without utilizing a portion of the intake box 64. In the illustrated embodiment, the cover member 126 is secured to the interior surface of the intake box 64 by a rivet 128, however, other suitable fasteners may also be used. Desirably, the cover member 126 defines a channel for receiving a seal 130 between the cover member 126 and the intake box 64 to substantially seal the oil separation chamber 124 from the remainder of the plenum chamber 66.

Advantageously, the oil separation chamber 124 is disposed within the plenum chamber 66. Such a construction makes efficient use of space available within the engine compartment by preserving the function of an external oil separator without occupying additional space beyond that of the intake box 64. In addition, by utilizing a portion of the intake box 64 to define a portion of the oil separation chamber 124, less raw material is necessary than if the oil separation chamber 124 were defined entirely by a separate member.

An inlet 132 allows blow-by gases within the third breather tube 122 to enter the oil separation chamber 124. In the illustrated embodiment, the inlet 132 is defined by a projecting flange portion 134 of the intake box 64, however, a separate member may also be employed to define the inlet 132. An end of the third breather tube 122 surrounds the inlet flange 134 in a substantially sealed arrangement. A separate clamping member may be used to secure the third breather tube to the inlet flange 134, if desired.

An outlet 136 of the oil separation chamber 124 is defined by a flange portion 138 of the cover member 126. A blow-by gas discharge passage 140 is defined by a discharge tube 142 and connects the outlet 136 to an opening 144 defined by one of the inlet ducts 85. The opening 144 allows communication between the blow-by gas discharge passage 140 and the intake port 62 associated with the inlet duct 85.

Advantageously, the inlet 132 is offset from the outlet 136. Desirably, the inlet 132 is spaced from the outlet 136 along a longitudinal axis of the watercraft 10. More desirably, the inlet 132 is positioned rearwardly of the outlet 136. When blow-by gases enter the oil separation chamber 124 from the third breather tube 122, the velocity of the blow-by gas reduces due to the increase in volume from the tube 122 to the chamber 124. As a result, the ability of the blow-by gas to carry oil mist decreases and the lubricating oil component of the blow-by gas tends to separate from the fuel vapor component. The spaced orientation between the inlet 132 and the outlet 136 provides increased time for this separation to occur.

The separated oil returns to the crankcase chamber 114 through the inlet 132 and breather tubes 122, 116, as illustrated by the arrow L in FIG. 4, so as to merge with other oil in the lubrication system again. Advantageously, by positioning the inlet 132 toward a rearward end of the oil separation chamber 124, the flow of separated oil into the inlet 132 is encouraged due to acceleration of the watercraft 10. The blow-by gases move through the gas discharge passage 140 to the opening 144 and into the intake port 62 as indicated by the arrow B in FIGS. 3 and 4. The blow-by gases then merge with fresh air A that is drawn into the intake port 64 and are introduced into the combustion chambers for combustion therein. The flow of the blow-by gases is due to the pressure in the intake box 64 which is normally less than the pressure in the crankcase chamber 114 under normal engine running conditions.

Desirably, the gas discharge passage 140 communicates with the intake port 64 of the throttle body 84 closest to the outlet 136 so that the length of the discharge passage 140 may desirably be kept short. However, the gas discharge passage 140 may communication with the intake port 64 of another, or multiple, throttle bodies 84. Additionally, although the illustrated gas discharge passage 140 communicates with the portion of the intake port 62 defined by the inlet duct 85, the discharge passage 140 may alternatively communicate with another portion of the intake port 62, such as that defined by the throttle body 85, or it may open into the plenum chamber 66 in general.

However, it is preferred that the gas discharge passage 140 opens directly into the intake port 62. Such a construction inhibits any oil mist remaining in the blow-by gas from coming into contact with the air filter element 98, which may eventually lead to clogging of the element 98 resulting in a reduction in engine performance due to restricted airflow. More preferably, the opening 144 is positioned on a side of the intake passage 62 opposite from the air filter element 98 to further reduce the likelihood of oil mist contacting the air filter element 98.

Of course, the foregoing description is that of preferred embodiments of the present invention, and various changes and modifications may be made without departing from the spirit and scope of the invention, as defined by the appended claims.

What is claimed is:

1. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising a plenum chamber, a blow-by gas ventilation system for allowing blow-by gasses to move along a ventilation flow path from the crankcase to the plenum chamber, the blow-by gas ventilation system comprising an oil separation chamber positioned within the plenum chamber, wherein the ventilation flow path passes through the oil separation chamber.

2. The watercraft of claim 1, the oil separation chamber additionally comprising an inlet communicating with at least the crankcase and an outlet communicating with the plenum chamber, wherein the inlet is offset from the outlet.

3. The watercraft of claim 2, wherein the inlet is positioned rearward of the outlet along a longitudinal axis of the watercraft.

4. The watercraft of claim 1, additionally comprising an air intake box at least partially defining the plenum chamber, the air intake box additionally defining a portion of the oil separation chamber.

5. The watercraft of claim 1, wherein the induction system comprises an induction guide arrangement at least partially defining an intake passage, an opening communicating with the intake passage, a ventilation passage connecting the outlet and the opening.

6. The watercraft of claim 5, wherein the induction guide arrangement comprises at least one throttle body and an inlet duct connected to the at least one throttle body, the opening communicating directly with the inlet duct.

7. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising a plenum chamber and a throttle body defining an intake port, a fuel delivery system for delivering fuel to the combustion chamber, the fuel delivery system comprising a fuel injector communicating with the intake port, a blow-by gas ventilation system for allowing blow-by gasses to move along a ventilation flow path from the crankcase to the plenum chamber, the blow-by gas ventilation system comprising an oil separation chamber positioned within the plenum chamber, wherein the ventilation flow path passes through the oil separation chamber.

8. The watercraft of claim 7, the oil separation chamber additionally comprising an inlet communicating with at least the crankcase and an outlet communicating with the plenum chamber, wherein the inlet is offset from the outlet.

9. The watercraft of claim 8, wherein the inlet is positioned rearward of the outlet along a longitudinal axis of the watercraft.

10. The watercraft of claim 7, additionally comprising an air intake box at least partially defining the plenum chamber, the air intake box additionally defining a portion of the oil separation chamber.

11. The watercraft of claim 7, wherein the induction system comprises an induction guide arrangement at least partially defining an intake passage, an opening communicating with the intake passage, a ventilation passage connecting the outlet and the opening.

12. The watercraft of claim 11, wherein the induction guide arrangement comprises at least one throttle body and an inlet duct connected to the at least one throttle body, the opening communicating directly with the inlet duct.

13. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising at least one throttle body having a throttle valve and an inlet duct connected to the at least one throttle body, the throttle body and inlet duct at least partially defining an intake passage, a blow-by gas ventilation system comprising an inlet communicating with the crankcase, an outlet communicating with the intake passage upstream of the throttle valve and a ventilation passage connecting the inlet and the outlet, wherein the induction system additionally comprises an air filter element, the outlet being disposed on a side of the intake passage opposite the air filter element.

14. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising at least one throttle body having a throttle valve and an inlet duct connected to the at least one throttle body, the throttle body and inlet duct at least partially defining an intake passage, a blow-by gas ventilation system comprising an inlet communicating with the crankcase, an outlet communicating with the intake passage upstream of the throttle valve and a ventilation passage connecting the inlet and the outlet, wherein the induction system additionally comprises a plenum chamber, the at least one throttle body being disposed within the plenum chamber.

15. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising at least one throttle body having a throttle valve and an inlet duct connected to the at least one throttle body, the throttle body and inlet duct at least partially defining an intake passage, a blow-by gas ventilation system comprising an inlet communicating with the crankcase, an outlet communicating with the intake passage upstream of the throttle valve and a ventilation passage connecting the inlet and the outlet, wherein the lubrication system additionally comprises a lubricant reservoir, a second inlet communicating with the reservoir and wherein the ventilation passage comprises a first portion and a second portion, the first portion of the ventilation passage connecting the inlet to the outlet of the intake passage and the second portion of the ventilation passage connecting the second inlet to the first portion of the ventilation passage.

16. The watercraft of claim 15, wherein the engine additionally comprises a cylinder head assembly, an overflow passage connecting the cylinder head of the engine to the reservoir.

17. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising at least one throttle body having a throttle valve and an inlet duct connected to the at least one throttle body, the throttle body and inlet duct at least partially defining an intake passage, a blow-by gas ventilation system comprising an inlet communicating with the crankcase, an outlet communicating with the intake passage upstream of the throttle valve and a ventilation passage connecting the inlet and the outlet, additionally comprising an oil separation chamber in communication with the ventilation passage and disposed intermediate the inlet and the outlet, wherein the induction system additionally comprises a plenum chamber, the oil separation chamber being disposed within the plenum chamber.

18. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising a plenum chamber, a blow-by gas ventilation system for allowing blow-by gasses to move along a ventilation flow path from the crankcase to the plenum chamber, means for separating lubricating oil from the blow-by gas, the means being positioned within the plenum chamber.

19. A watercraft comprising a hull defining an engine compartment, an internal combustion engine disposed in the engine compartment, a propulsion device driven by the engine, the engine having an engine body defining a crankcase and at least one combustion chamber therein, a lubrication system for supplying lubricant to at least the crankcase of the engine, an induction system configured to guide air along an induction airflow path to the combustion chamber for combustion therein, the induction system comprising a plenum chamber, an air filter element and at least one throttle body, the air filter element being positioned upstream from the at least one throttle body, a blow-by gas ventilation system for allowing blow-by gasses to move along a ventilation flow path from the crankcase to the plenum chamber, the blow-by gas ventilation system comprising an oil separation chamber, the air filter element, the at least one throttle body and the oil separation chamber being disposed within the plenum chamber, the at least one throttle body being positioned between the air filter element and the oil separation chamber.

20. The watercraft of claim 19, wherein the air filter element and the oil separation chamber are disposed on opposing lateral sides of the plenum chamber.

* * * * *